United States Patent Office 3,082,146
Patented Mar. 19, 1963

3,082,146
PROCESS FOR THE TREATMENT OF WATER
John F. Wentworth, Oaklawn, and John R. Hefler, Jamestown, R.I., assignors to Chemical Research Laboratories of America, Inc., Lafayette, R.I., a corporation of Rhode Island
No Drawing. Filed Feb. 4, 1959, Ser. No. 791,041
2 Claims. (Cl. 167—17)

This invention relates to the process and composition for the treatment of water, for the purpose of killing microorganisms, such as those producing slime growths in paper mill white water systems and closed recirculation cooling towers and air conditioning systems and the like.

This invention is an improvement on existing treatments in that it can be used as a non-toxic and non-irritating preparation which can be handled with safety by workmen. It is an improvement also on treatments used heretofore, that, in addition to controlling the growth of microorganisms, it also reduces objectionable odors, and the concentration of active material in the water system can be readily checked by simple analysis. A further advantage is that it does not exhibit corrosive effect on metals in the water system or degrade or weaken organic fibres such as paper mill felts, and is not readily dissipated.

These advantages do not apply solely to paper mills and cooling systems, but in the concentrations required in water for microorganisms control can be applied to potable water systems, swimming pools, rinse solutions for food equipment, dairies, slaughter houses, and to ice used to prevent spoilage of fish and other foods.

Treatments for microorganism control based on chlorine, hypochlorites or chloramines, heavy metal compounds—mercurials and the like, or quaternary ammonium compounds, have disadvantages: some are hazardous to handle as concentrates, are costly, are too quickly dissipated, do not kill all microorganisms or may be such that microorganisms may acquire an immunity or tests therefor cannot be readily made in a water system so as to be controlled accurately.

Chlorine dioxide has been known to be completely effective against microorganisms, reduce odors and be safe for potable water system sterilization. In a water system, it is more effective and stable than chlorine, hypochlorites or chloramines, in the presence of inorganic reducing agents, so that it exerts a more selective action in controlling microorganisms. Its use in bleaching has shown it to have less effect in degrading organic fibres. Tests can be made therefor, like chlorine; and also like chlorine, it is effective against a broad spectrum of microorganisms, with no immunity being acquired to resist its effects.

However, chlorine dioxide itself is a hazardous material to handle, unstable and generally difficult to produce and to apply where needed.

This invention involves the use of a chlorine dioxide derivative as an active germicide and sterilizing agent for water systems and to reduce color and/or odor of supplies or recirculating systems in a form that is safe and convenient to use by release of chlorous acid rather than other forms of chlorine compounds, such as chlorine dioxide or hypochlorites.

Like chlorine, chlorine dioxide is soluble in water and hydrolyzes with water to form two products. Just as chlorine produces two acids, hydrochloric or hypochlorous, chlorine dioxide produces chlorous acid and chloric acid. As is the case with chlorine, where the unstable and reactive component is hypochlorous acid, the reactive component with chlorine dioxide is the chlorous acid.

The compositions of this invention comprise reaction products of chlorine dioxide with alkaline peroxygen compounds or chlorites capable of producing chlorous acid by hydrolysis or reactions leading to formation of chlorous acid by oxidation reduction. In some cases buffering agents are included to promote formation of chlorous acid upon hydrolysis in the water system by increasing the hydrogen ion concentration. In systems from 4 to 6 pH, or in many mill white water systems, introduction of the compounds will give effective reduction in count of microorganism. In systems of higher pH, or lesser hydrogen ion concentration, it is necessary to maintain a higher residual, and it is desirable to feed acidifying agents including mineral acids or acid salts with the compound, to promote an effective amount of chlorous acid in the system. Peroxygen compounds are useful to reduce formation of hypochlorous acids and chlorine compounds of valence above 3.

*Example 1.*—For acid water systems, the addition of a chlorite will produce chlorous acid in situ by hydrolysis and is effective as a disinfecting agent when a residual is indicated by orthotolidine test.

The desired reaction is hydrolysis of a chlorite to undissociated chlorous acid.

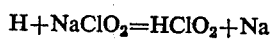
$$H + NaClO_2 = HClO_2 + Na$$

It is our theory that the formation of $ClO_2$, chlorine dioxide, is ineffective and should be inhibited so as to obtain maximum amounts of $HClO_2$. In a strongly acid water, particularly one with an oxidizing agent present, for example one with a chlorine residual, the undissociated $HClO_2$ formed could react further according to:

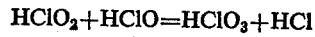
$$HClO_2 + HClO = HClO_3 + HCl$$

The treatment with chlorite alone of a non-oxidizing acid water would be effective, but in case the water is very low in pH or oxidizing materials are present, more chlorite would be required due to possible loss of $HClO_2$ to $ClO_2$, $HClO_3$, or salts of $HClO_3$.

Therefore, further examples are given to demonstrate means of promoting maximum hydrolysis of $HClO_2$, undissociated chlorous acid from chlorites or reactions leading to the formation of chlorites or chlorous acid.

*Example 2.*—For nearly neutral water systems, acid salts such as metaphosphates or metaborates can be added to the chlorite to promote hydrolysis of chlorous acid. The quantity used would be such that the alkalinity of the chlorite salt, such as sodium chlorite or of excess alkalis present as impurities, is reduced or neutralized.

In case of a neutral or nearly neutral water, the addition of straight commercial sodium chlorite might tend to reduce hydrogen ion concentration still further, due to its alkaline hydrolysis being the salt of a strong base and weak acid, and possibly to presence of excess alkali in preparing the original chlorite.

In such cases the chlorite would be more effective if its own alkaline reaction is offset by addition of an acid or an acid salt so that, on introduction to the water system, the hydrogen ion concentration is at least not reduced and even increased. An excess of an inexpensive material giving an acid reaction would not be harmful and the amount is not critical.

*Example 3.*—For neutral or slightly alkaline water systems, more acid salts or mineral acids in excess of the alkali content of the chlorine is used, and generally a higher residual, as indicated by tests with orthotolidine, is maintained so as to preserve sufficient chlorous acid by hydrolysis for microorganism control. This would be the case where the amounts of acidifying agents referred to in Example 2 are used to promote a reduction in pH of the water system.

*Example 4.*—In place of the chlorite in the above example, a combination of reagents leading to the formation of a chlorite can be reacted previously or combined in the water system, if temperature, pH and retention time are favorable. Such combinations are: (a) an acid mixture of a chloride and a chlorate in approximately equimolar quantities; or, (b) the mixture (a) with a peroxygen compound or other reducing agent to promote formation of chlorous acid; (c) a solution of chlorine dioxide, hydrogen peroxide and an alkali or an alkali salt, or of chlorine dioxide and a peroxygen compound such as sodium peroxide or sodium percarbonate wherein there is one-half to one mole of hydrogen peroxide for each mole of chlorine dioxide.

There is a tendency for chlorous acid to be formed in acid media from a mixture of chlorates and chlorides by the reaction:

$$HClO_3 + HCl = HClO_2 + HClO$$

However, the further reaction:

$$2HClO_2 + HClO = 2ClO_2 + H_2O + HCl$$

which is known to occur in strongly acid concentrated solutions should be suppressed by reactions such as:

$$HClO + H_2O_2 = HCl + H_2O + O_2$$

or $$2ClO_2 + H_2O_2 = 2HClO_2 + O_2$$

hydrolysis of $ClO_2$
aqueous $$2ClO_2 + H_2O = HClO_2 + HClO_3$$

with peroxygen compound $$2ClO_2 + H_2O_2 = 2HClO_2 + O_2$$

The presence of peroxygen compounds in the water system along with chlorites or materials capable of forming chlorites will, in all cases, tend to increase formation of chlorous acid and inhibit reaction of chlorous acid to a higher compound, such as $ClO_2$ or a chlorate, which would diminish the residual available for bactericidal action.

The effect in the water system will be governed by pH to the extent that hydrogen ion concentration will be the governing factor in determining the amount of undissociated chlorous acid formed from a given amount of chlorite.

In all probability, a direct brute force approach of feeding sufficient sodium chlorite to obtain a residual by orthotolidine test will be effective in controlling microorganisms and will also produce a cleaner, fresher odor in a water system. The additives present to prevent loss of chlorous acid and lower pH are beneficial but not essential.

In most cases, the materials given are solids in mixture to facilitate conjoint presentation to the hydrolyzing aqueous medium and for convenience in shipping and storage; however, the feed to the water system can be made by the addition of the solid or, alternatively, the continuous addition of a moderately concentrated solution of the materials given to provide convenient distribution through the system and ease of application.

In white water treatment, the amount of material added should be sufficient to maintain 1/10 p.p.m. residual of $HClO_2$ in effluent from the process. A typical feed to a white water system is 1 p.p.m. or 1 lb. of chlorous acid per million pounds of white water.

One method for determining feed is to establish the $HClO_2$ consumed by a sample of the water to be treated, as in the following tables of "Determination of Dioxide Demand" and "Determination of Residual:"

*Determination of Dioxide Demand of Water*

PROCEDURE (1) Adjust the pH of the sample (approximately 1 gallon) to 4.0.

(2) Label 6 flasks. Place 200 mls. of adjusted sample in each flask.

(3) Pipette 1 ml. of concentrated dioxide into a 100 ml. volumetric and dilute to the mark.

(4) To flask No. 1 add 0.2 ml. diluted dioxide and record the time the addition was made.

To flask No. 2 add 0.4 ml. diluted dioxide. Record time. To flask No. 3 add 0.6 ml. diluted dioxide. Record time. To flask No. 4 add 0.8 ml. diluted dioxide. Record time. To flask No. 5 add 1.0 ml. diluted dioxide. Record time. Flask No. 6 is not treated but serves as a blank.

(5) At the end of a 2 hour contact time, the amount of dioxide remaining in the samples is measured by the Starch Iodide Method of Determination of Residual $HClO_2$. Record this value as A.

(6) Label five flasks. Place 200 mls. distilled water in each flask. To each flask add the same amount of diluted dioxide as was added to the samples. Immediately measure the concentration of dioxide in these flasks by the Starch Iodide Method. Record this value as B.

CALCULATIONS (1) The known concentrations of dioxide (B) minus the dioxide residual (A) is the dioxide demand of the sample of water.

$$B - A = \text{dioxide demand}$$

*Determination of Residual $HClO_2$ Starch Iodide Method*

PROCEDURE (1) Place 100 ml. of sample in a 250 ml. Erlenmeyer flask.

(2) Add one crystal KI and 1 ml. of concentrated HCl.

(3) Add starch indicator. Blue color indicates presence of residual $HClO_2$. If any other oxidizing agents are present that will liberate $I_2$ from KI, it will be necessary to run a blank. Take a sample before the introduction of $HClO_2$ into the system and run it the same as sample being tested for residual $HClO_2$. Ml. of $Na_2S_2O_3$ used for titrating sample minus ml. of $Na_2S_2O_3$ used for titrating blank will give ml. of $Na_2S_2O_3$ used for titration of residual $HClO_2$.

(4) Allow to stand for 10 minutes and titrate with 0.001 N $Na_2S_2O_3$ until the blue color disappears.

CALCULATIONS $$HClO_2 + 4KI + 3HCl = 4KCl + 2H_2O + 2I_2$$
$$2I_2 + 4Na_2S_2O_3 = 4NaI + 2Na_2S_4O_6$$
$$1\ HClO_2 \text{ is equal to } 4Na_2S_2O_3$$

ml. $Na_2S_2O_3 \times N Na_2S_2O_3$ = milliequivalent of $Na_2S_2O_3$
milliequivalents of $Na_2S_2O_3$ = milliequivalents of $HClO_2$ P.p.m. $HClO_2$ = mg./l.

$$= \frac{\text{milliequivalents} \times \text{equivalent weight}}{\text{liters}}$$

Equivalent wt. $HClO_2 = \frac{68.465}{4} = 17.116$ milliequivalents/liter $= \frac{\text{milliequivalents}}{\text{vol. samples, liters}} = \text{me.} \times 10$ P.p.m. $HClO_2$ = ml. $Na_2S_2O_3 \times 0.001 \times 10$
$\times 17.12$ = ml. $Na_2S_2O_3 \times 0.1712$

We claim:
1. A process for preventing the growth of microorganisms in a circulating water system which comprises continuously adjusting the pH of said system to a value between about 4 and 8 while maintaining a residual chlorous acid concentration in said circulating water of between about 1 and 0.1 p.p.m. by mixing therewith sodium chlorite and a peroxygen compound selected from the group consisting of hydrogen peroxide, sodium peroxide and sodium percarbonate.

2. A process for preventing slime growth in a recirculating paper mill white water system which comprises continuously adjusting the pH of said system to a value between about 4 and 6 while maintaining a residual chlorous acid concentration in said circulating water of between about 1 and 0.1 p.p.m. by mixing therewith sodium chlorite and a peroxygen compound selected from the group consisting of hydrogen peroxide, sodium peroxide and sodium percarbonate.

References Cited in the file of this patent

UNITED STATES PATENTS

| | | |
|---|---|---|
| 2,064,541 | Hershman | Dec. 15, 1936 |
| 2,071,091 | Taylor | Feb. 16, 1937 |
| 2,358,866 | MacMahon | Sept. 26, 1944 |
| 2,903,327 | Rogers | Sept. 8, 1959 |